United States Patent
Higashida et al.

(10) Patent No.: US 9,352,370 B2
(45) Date of Patent: May 31, 2016

(54) PLUG FOR HOT TUBE-MAKING

(71) Applicant: NIPPON STEEL & SUMITOMO METAL CORPORATION, Tokyo (JP)

(72) Inventors: Yasuto Higashida, Kobe (JP); Yasuyoshi Hidaka, Kobe (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/433,154

(22) PCT Filed: Dec. 16, 2013

(86) PCT No.: PCT/JP2013/083635
§ 371 (c)(1),
(2) Date: Apr. 2, 2015

(87) PCT Pub. No.: WO2014/109180
PCT Pub. Date: Jul. 17, 2014

(65) Prior Publication Data
US 2015/0258591 A1 Sep. 17, 2015

(30) Foreign Application Priority Data
Jan. 11, 2013 (JP) ................................ 2013-003665

(51) Int. Cl.
*B21B 19/04* (2006.01)
*B21B 25/00* (2006.01)
*C23C 4/02* (2006.01)
(Continued)

(52) U.S. Cl.
CPC .................. *B21B 25/00* (2013.01); *B21B 17/02* (2013.01); *B21B 19/04* (2013.01); *B23K 9/046* (2013.01); *B23K 10/027* (2013.01); *C23C 4/02* (2013.01); *C23C 4/06* (2013.01); *B23K 2201/20* (2013.01); *B23K 2203/04* (2013.01)

(58) Field of Classification Search
CPC ........ B21B 25/00; B21B 19/04; B21B 17/02; B23C 4/25; B23C 4/105; B23C 4/08; B23C 4/06; B23C 4/02; B23K 9/046; B23K 10/027
USPC ........................ 72/96, 97, 208, 209, 423, 442
See application file for complete search history.

(56) References Cited

U.S. PATENT DOCUMENTS

| 2,392,821 A | * | 1/1946 | Kreag | ..................... B21B 25/00 |
| | | | | 420/442 |
| 4,393,677 A | * | 7/1983 | Tamura | ................... B21B 25/00 |
| | | | | 72/209 |

(Continued)

FOREIGN PATENT DOCUMENTS

| CN | 101848777 | | 9/2010 |
| CN | 102284777 | * | 12/2011 |

(Continued)

OTHER PUBLICATIONS

Machine Translation of CN 102284777 which is dated Dec. 2011 (4 pages).*

(Continued)

*Primary Examiner* — David B Jones
(74) *Attorney, Agent, or Firm* — Kenyon & Kenyon LLP

(57) ABSTRACT

A plug for hot tube-making includes: a plug main body; a build-up layer formed around an axis of the plug main body on a surface of the plug main body; and a sprayed coating formed on a surface of the build-up layer.

5 Claims, 6 Drawing Sheets

(51) Int. Cl.
*C23C 4/06* (2016.01)
*B23K 9/04* (2006.01)
*B23K 10/02* (2006.01)
*B21B 17/02* (2006.01)

(56) References Cited

U.S. PATENT DOCUMENTS

| | | | | |
|---|---|---|---|---|
| 5,031,434 A * | 7/1991 | Takase | ............ | B21B 25/00 72/209 |
| 6,073,331 A * | 6/2000 | Katsumura | ............ | B21B 25/00 29/423 |
| 6,202,463 B1 * | 3/2001 | Yorifuji | ............ | B21B 25/00 72/209 |
| 7,383,710 B2 * | 6/2008 | Yamakawa | ............ | B21B 25/00 72/209 |
| 8,544,306 B2 * | 10/2013 | Higashida | ............ | B21B 25/00 72/208 |
| 2010/0050723 A1 * | 3/2010 | Hidaka | ............ | B21B 25/00 72/97 |
| 2015/0075241 A1 * | 3/2015 | Yamamoto | ............ | B21B 19/04 72/47 |

FOREIGN PATENT DOCUMENTS

| | | |
|---|---|---|
| GB | 2094061 | 9/1982 |
| JP | 57-155720 | 9/1982 |
| JP | 61-286077 | 12/1986 |
| JP | 62-183950 | 8/1987 |
| JP | 63-203205 | 8/1988 |
| JP | 64-007147 | 2/1989 |
| JP | 03-193204 | 8/1991 |
| JP | 04-008498 | 2/1992 |
| JP | 04-074848 | 3/1992 |
| JP | 04-270003 | 9/1992 |
| JP | 08-066705 | 3/1996 |
| JP | 2776266 | 7/1998 |
| JP | 10-306383 | 11/1998 |
| JP | 2000-033512 | 2/2000 |
| JP | 2005-014558 | 1/2005 |
| JP | 3891679 | 3/2007 |
| JP | 2009-101408 | 5/2009 |
| JP | 4279350 | 6/2009 |
| JP | 5075575 | 11/2012 |

OTHER PUBLICATIONS

International Search Report dated Jan. 14, 2014 issued in corresponding PCT Application No. PCT/JP2013/083635.

Office Action dated Sep. 6, 2015 issued in related Chinese Application No. 201380055291.8 [with English Translation].

* cited by examiner

PLUG FOR HOT TUBE-MAKING

TECHNICAL FIELD

This application is a national stage application of International Application No. PCT/JP2013/083635, filed Dec. 16, 2013, which claims priority to Japanese Application No. 2013-003665, filed on Jan. 11, 2013, each of which is incorporated by reference in its entirety.

The present invention relates to a plug, and, in more detail, to a plug for hot tube-making which is used in piercers, elongators and the like. Hereinafter, a plug for hot tube-making will be simply referred to as "plug".

BACKGROUND ART

The Mannesmann tube-making process is widely employed as a process for manufacturing seamless tubes. In the Mannesmann tube-making process a round billet that is heated to approximately 1200° C. is pierced and rolled using a piercer. The piercer includes a pair of inclined rolls and a plug. The plug is disposed on a path line between the pair of inclined rolls. In the piercer, a round billet is pressed to the plug while being rotated in a circumferential direction using the inclined rolls. As a result, the round billet is pierced and rolled so as to form a hollow shell. Furthermore, as necessary, the hollow shell is drawn and rolled in an elongator so as to increase the diameter and to decrease the thickness. The elongator has the same configuration as the piercer, and includes a pair of inclined rolls and a plug.

As described above, die plug is used in the piercing-rolling of high-temperature round billets, the drawing-rolling of hollow shells, and the like. Therefore, heat and high contact pressure are delivered to the surface of the plug from round billets or hollow shells. As a result, wear or seizure occurs on the surface of the plug, or melting loss occurs on the plug. The service life of the plug is shortened due to the wear and the seizure which occur on the surface of the plug and due to the melting loss which occurs on the plug.

Generally, on the surface of a plug main body (base metal of the plug), an oxidized scale coating is formed. The oxidized scale coating shields heat from round billets so as to suppress the occurrence of the seizure or the melting loss. For example, Patent Documents 1 to 5 disclose plugs including an oxidized scale coating.

However, the oxidized scale coating has low wear resistance. Therefore the oxidized scale coating is worn each time a round billet is pierced and rolled. When the thickness of the oxidized scale coating decreases due to wearing, the temperature of the plug main body increases. As a result, the seizure or the melting loss occurs on the plug. Particularly in a case in which the plug is used in the piercing-rolling of and billet made of a high alloy containing a large content of chromium and nickel, the oxidized scale coating is significantly worn.

In a case in which the oxidized scale coating is worn, it is possible to form an oxidized scale coating again on the plug main body by carrying out a heat treatment. However, since the heat treatment takes a long time in a range of several hours to several tens of hours, the production efficiency decreases.

Patent Documents 6 to 9 disclose plugs including a coating other than the oxidized scale coating.

A plug disclosed in Patent Document 6 includes an arc-sprayed coating made of an iron oxide. The arc-sprayed coating has better wear resistance than the oxidized scale coating.

Plugs disclosed in Patent Documents 7 to 9 include a build-up layer on the surface. The build-up layer has excellent high-temperature strength and excellent wear resistance.

PRIOR ART DOCUMENT

Patent Document

[Patent Document 1] Japanese Examined Patent Application, Second Publication No. H4-8498
[Patent Document 2] Japanese Unexamined Patent Application, First Publication No. H4-74848
[Patent Document 3] Japanese Unexamined Patent Application, First Publication No. H4-270003
[Patent Document 4] Japanese Examined Patent Application, Second Publication No. H1-7147
[Patent Document 5] Japanese Unexamined Patent Application, First Publication No. S63-203205
[Patent Document 6] Japanese Patent No. 4279350
[Patent Document 7] Japanese Patent No. 5075575
[Patent Document 8] Japanese Patent No. 3891679
[Patent Document 9] Japanese Patent. No. 2776266

SUMMARY OF THE INVENTION

Problems to be Solved by the Invention

The arc-sprayed coating has lower high-temperature strength than the build-up layer. Therefore, in a case in which the plug of Patent Document 6 is used in the piercing-rolling of high alloy billets, the seizure and the melting loss occur on the plug easily, and there are cases in which the service life of the plug is shortened.

Since the plugs of Patent Documents 7 to 9 have the build-up layer, the high-temperature strength is excellent. However, in a case in which the plugs described in the above documents are used in the piercing or rolling of high alloy billets as well, there are cases in which the seizure and the melting loss occur on the plug, and the service life of the plug is shortened.

The invention has been made in consideration of the above circumstances, and an object of the present invention is to provide a plug, for hot tube-making which can improve the service life of the plug.

Means for Solving the Problems

The present invention employs the following means in order to solve the above-described problems and to achieve the relevant object. That is, (1) A plug for hot tube-making according to an aspect of the present invention includes a plug main body; a build-up layer formed on a surface of the plug main body around an axis of the plug main body; and a sprayed coating formed on a surface of the build-up layer.

(2) In the plug for hot tube-making according to (1) the build-up layer may be formed on a surface of a front portion of the plug main body. In addition, the build-up layer may include a tapered surface. Furthermore, the sprayed coating may be formed on the tapered surface.

(3) In the plug for hot tube-making according to (1), the sprayed coating may coat an entire surface of the build-up layer.

(4) In the plug for hot tube-making according to (1), the surface of the plug main body may include: a first surface region in which the build-up layer is to be formed; and a second surface region provided behind the first surface region in the plug main body. In addition, the sprayed coating may include a first sprayed region formed on the surface of the build-up layer; and a second sprayed region formed on the second surface region.

(5) in the plug for hot tube-making according to (4), the second sprayed region may be adjacent to the first sprayed region.

(6) in the plug, for hot tube-making according to any one of (1) to (5), the build-up layer may coat a front end of the plug main body.

Effects of the Invention

According to the above aspects, it is possible to provide a plug for hot tube-making which can improve the service life of the plug.

EMBODIMENTS OF THE INVENTION

The present inventors carried out investigations and studies in order to improve the service life of plugs, and have obtained the following knowledge.

A build-up layer has a higher high-temperature strength compared to a sprayed coating and an oxidized scale coating. However, the build-up layer has a lower heat-shielding property compared to the sprayed coating and the oxidized scale coating.

Figure 1:
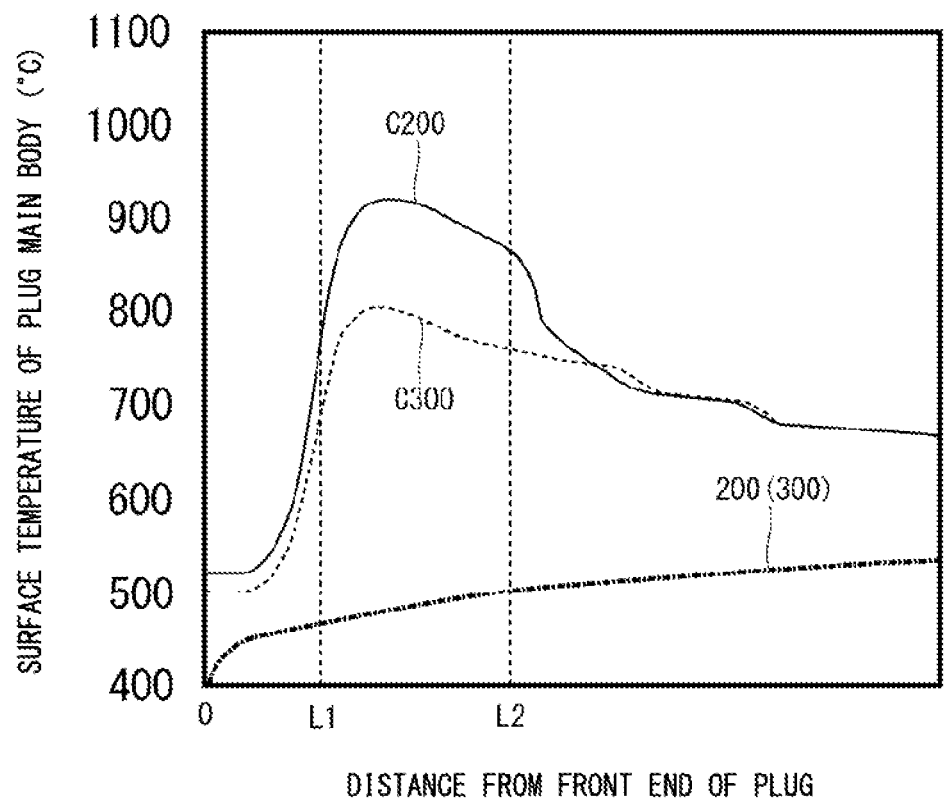
FIG. 1 is a view illustrating a distribution of the surface temperature of a plug main body during piercing and rolling, which has been obtained by simulating.

FIG. 1 is a view illustrating the simulation results of plug temperatures in a period that workpieces are drawn and rolled by an elongator. FIG. 1 is obtained using the following method.

Figure 2:
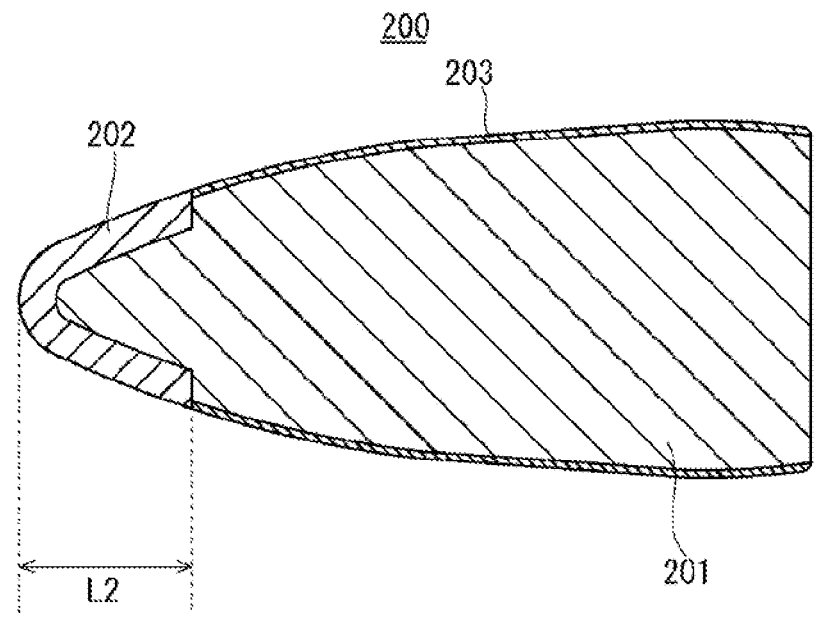
FIG. 2 is a longitudinal section vice of a plug used to obtain FIG. 1 by simulating.
Figure 3:
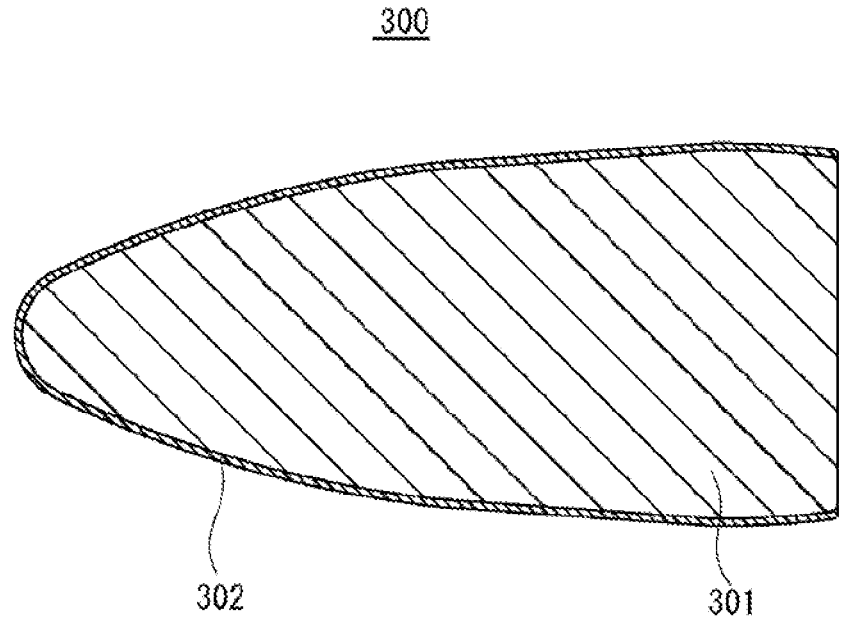
FIG. 3 is a longitudinal section view of another plug used to obtain FIG. 1 by simulating.

A plug 200 illustrated in FIG. 2 and a plug 300 illustrated in FIG. 3 are assumed. The plug 200 in FIG. 2 includes a plug main body 201, a build-up layer 202 and a sprayed coating 203. The build-up layer 202 is thrilled on the surface of a front end portion of the plug main body 201 so as to coat a front end of the plug main body 201. The length from the front end of the plug 200 to a rear end of the build-up layer 202 is represented by L2. On the surface of the plug main body 201, the sprayed coating 203 is formed in a region between the rear end of the build-up layer 202 and a rear end of the plug main body 201 (however, the region does not include a rear end surface of the plug, main body 201).

The plug 300 in FIG. 3 includes a plug main body 301 and an oxidized scale coating 302. On the surface of the plug main body 301, the oxidized scale coating 302 is formed throughout the entire region except for a rear end surface. The plug 200 and the plug 300 both have substantially the same shape.

In this simulation, a hollow shell is assumed as the workpiece. The material of the hollow shell is set to SUS304, and a temperature condition is set to 1200° C. A rolling reduction of piercing-rolling is set to 25%, and a drawing-rolling time is set to 15 seconds. As a result of carrying out a FEM analysis under the above-described conditions, the simulation results illustrated in FIG. 1 are obtained.

The horizontal axis in FIG. 1 indicates the distance from the front end of the plug 200 or the plug 300. The one-dot chain lines in the lower part of FIG. 1 schematically illustrate the plug shapes of the plug 200 and the plug 300. The vertical axis in FIG. 1 indicates the surface temperature of the plug main body 201 or 301. In this simulation, an inner surface of the workpiece (hollow shell) is brought into contact with the plug 200 and the plug 300 at a distance L1 (refer to FIG. 1). Therefore, during the rolling, regions on the surfaces of the plug 200 and the plug 300 beyond the distance L1 remain in contact with the workpiece.

The solid line C200 in FIG. 1 illustrates the surface temperature of the plug body 201. The dashed line C300 in FIG. 1 illustrates the surface temperature of the plug main body 301.

As illustrated in FIG. 1, in the regions (the regions beyond the distance L1) on the surfaces of the plug main bodies 201 and 301 which are in contact with the workpiece the temperature (C200) of the surface the region between the distance L1 and the distance L2) of the plug main body 201 on which the build-up layer 202 is formed is approximately 100° C. higher than the surface temperature (C300) of the corresponding plug main body 301. Furthermore, on the surface of the plug main body 201, the temperature of a region behind the build-up layer 202 in which the sprayed coating 203 is formed is approximately 100° C. lower than the temperature of the region in which the build-up layer 202 is formed.

As described above, the build-up layer 202 has a lower heat-shielding property than the sprayed coating 203 and the oxidized scale coating 302. Therefore, in the region of the plug 200 in which the build-up layer 202 is formed, the amount of heat input from the workpiece (round billet or hollow shell) during piercing increases.

In a case in which the plug 200 is used in the rolling of a high alloy workpiece containing a large content of Cr and Ni, since the build-up layer 202 has excellent high-temperature strength, in the portion of the plug 200 in which the build-up layer 202 is formed, the occurrence of wearing and distortion is suppressed.

However, the build-up layer 202 has a lower heat-shielding property than the oxidized scale coating 302 and the sprayed coating 203. Therefore, as illustrated in FIG. 1 the amount of heat input from the workpiece to the plug main body 201 through the build-up layer 202 during piercing-rolling is larger than the amount of heat input from the workpiece to the plug main body 301 through the oxidized scale coating 302 and the amount of heat input to the plug main body 201 through the sprayed coating 203. As a result, particularly, in a case in which the plug 200 is used in the piercing-rolling of a high alloy workpiece containing a large content of Ni and Cr, there are cases in which the temperature of the plug main body 201 excessively increases so that the plug 200 is distorted as illustrated in FIG. 4.

Figure 4:
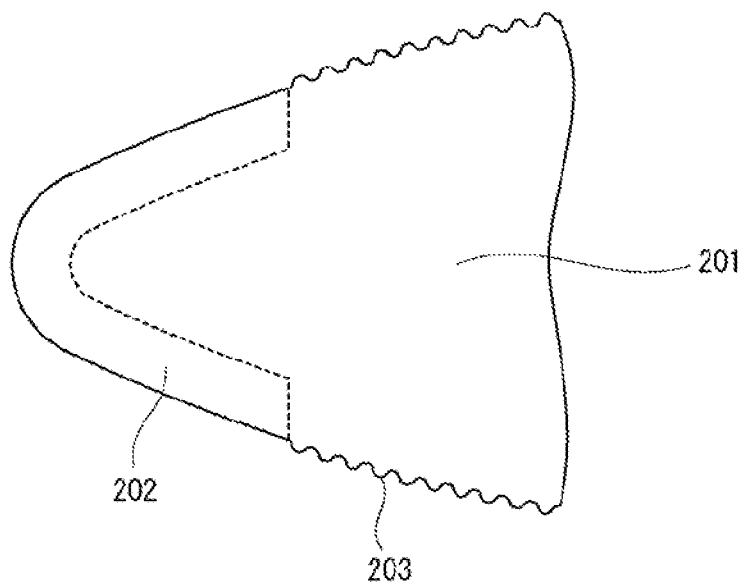
FIG. 4 is a schematic view of a plug front end portion when a high alloy billet has been pierced and roiled using a plug including a build-up layer at a front end.

As illustrated in FIG. 4, even in a case which heat is delivered to the plug main body 201 from the build-up layer 202, and, consequently, the temperature of the plug main body 201 excessively increases, since the build-up layer 202 has excellent high-temperature strength, the portion in which the build-up layer 202 is formed is not easily distorted. However, in the plug main body 201, the portion in which the build-up layer 202 is not formed in other words, the portion in which the sprayed coating 203 is formed) becomes more likely deformed, and the surface becomes wavy. This is because the temperature of the plug main body 201 increases so that the strength decreases.

The distortion of the plug main body 201 causes scratches on an inner surface of the hollow shell. Not only that, the seizure and the melting loss occur easily on the plug main body 201. Therefore the continuous use of the plug 200 becomes difficult. As a result, there are cases in which the service life of the plug shortens even when the plug 200 includes the build-up layer 202.

Based on the above-described simulation results, the present inventors thought that, when the sprayed coating is formed on the surface of the build-up layer, it is possible to suppress the input of heat from the workpiece to the plug main body through the build-up layer. As illustrated in FIG. 1, the sprayed coating has a higher heat-shielding property than the build-up layer. When the sprayed coating is formed on the build-up layer, higher high-temperature strength can be obtained due to the build-up layer, and, furthermore, a higher heat-shielding property can be obtained due to the sprayed coating. Therefore, even in a case in which the plug is used in the piercing and rolling of a high alloy workpiece it is possible to suppress the amount of heat input to the plug main body including the build-up layer, and the service life of the plug improves.

Based on the above-described knowledge, a plug of the present embodiment described below is completed.

The plug of the embodiment is a plug for hot tube-making. The plug includes a plug main body, a build-up layer and a sprayed coating. The build-up layer is formed around an axis of the plug main body on a surface of the plug main body. The sprayed coating is formed on a surface of the build-up layer.

As described above, since the build-up layer has higher high-temperature strength, the distortion of the plug is suppressed. Furthermore, since the sprayed coating is formed on the build-up the input of heat to the build-up layer is suppressed so that it is possible to suppress an increase in the temperature of the plug main body during piercing-rolling. Therefore, the distortion of the plug is suppressed, and the melting loss and the seizure do easily occur. Therefore, it is possible to extend the service life of the plug in a case in which a high alloy workpiece is rolled.

The build-up layer is preferably formed on a surface of a front portion of the plug main body. In addition, the build-up layer includes a tapered surface that inclines with respect to a central axis of the plug main body. The sprayed coating is formed on the tapered surface of the build-up layer.

In this case, since a rolled portion of the plug has a tapering shape, during piercing-rolling, an external force (a force that presses the sprayed coating to the build-up layer) is delivered to the sprayed coating on the build-up layer. Therefore, the sprayed coating is not easily exfoliated from the build-up layer.

The sprayed coating more preferably coats the entire surface of the build-up layer.

In this case, the input of heat from the workpiece to the build-up layer during piercing-rolling is further suppressed.

The surface of the plug main body preferably includes a first surface region and a second surface region. The build-up layer is formed in the first surface region. The second surface region is adjacent to a rear end of the first surface region, and is disposed behind the first, surface region in the plug main body. The sprayed coating includes a first sprayed region and a second sprayed region. The first sprayed region is formed on the surface of the build-up layer. The second sprayed region is formed on the second surface region.

In this case, in the plug main body, the sprayed coating is formed in a rear portion of the build-up layer. Therefore, the heat-shielding property of the plug improves, and the service life of the plug extends.

The second sprayed region is preferably adjacent to the first sprayed region.

In this case, the heat-shielding, property and the wear resistance of the plug further improve, and the service life, of the plug extends.

Hereinafter, a plug according to an embodiment of the present invention will be described with reference to the accompanying drawings. In the drawings, the same or equivalent portions will be given the same reference signs, and will not be described again.

[Configuration of a Piercer]

The plug according to the present embodiment is used in piercers or elongators. In the following description, the plug will be described using a piercer as an example. However, the plug being used in an elongator also has the same configuration.

Figure 5:
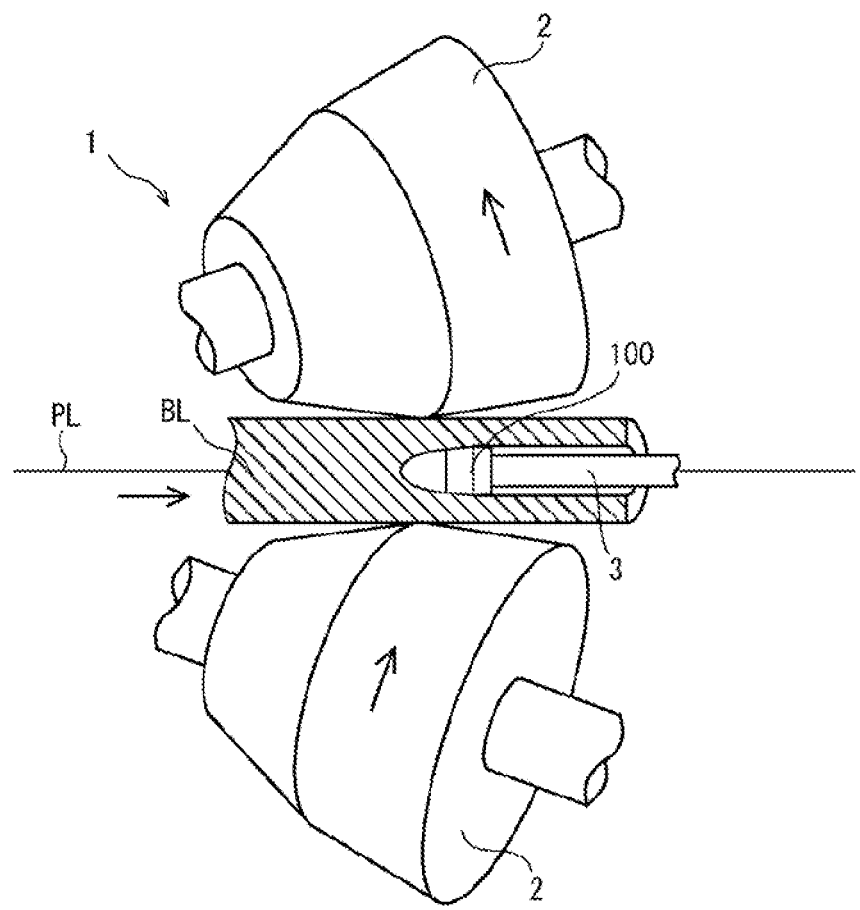
FIG. 5 is a schematic view of a piercer including a plug according to an embodiment of the present invention.

FIG. 5 is an overall configuration view of a piercer 1. As illustrated in FIG. 5, the piercer 1 includes a pair of inclined rolls 2, a plug 100 and a core bar 3.

The pair of inclined rolls 2 is disposed around a pass line PL. The inclined rolls 2 roll a round billet BL, which is a workpiece, while rotating, the billet in a circumferential direction. The inclined rolls 2 may have a cone shape or a barrel shape.

The plug 100 is disposed on the pass line PL between the pair of inclined rolls 2. The core bar 3 has a rod shape, and is disposed on the pass line PL. The plug 100 is attached to a front end of the core bar 3. The core bar 3 fixes the plug 100 on the path line PL.

In the piercer 1 configured as described above, the plug 100 is inserted into a center of a front end surface (that is, an end surface opposite to the plug 100) of the round billet BL. As a result, the round billet BL is pierced and rolled, thereby forming a hollow shell.

[Configuration of the Plug 100]

Figure 6:
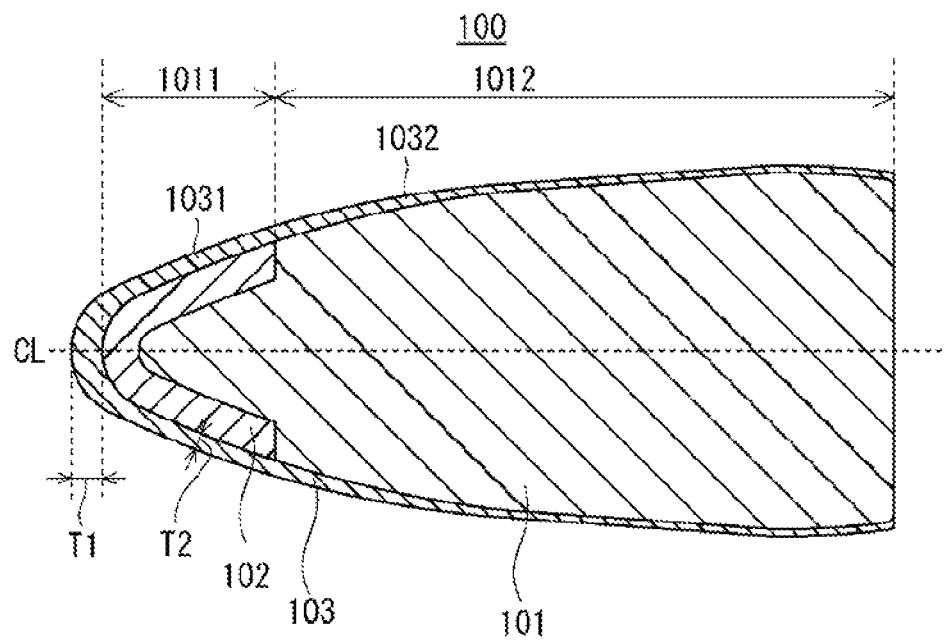
FIG. 6 is a longitudinal section view of a plug in FIG. 5.

FIG. 6 is a longitudinal section view of the plug 100. The longitudinal section view stated herein refers to a cross section including a central axis CL of the plug 100.

The cross-sectional shape of an outer circumferential surface of the plug 100 is a circle. The plug 100 has an outer diameter that is larger in the rear end portion of the plug 100 than the front end portion of the plug 100. For example, as illustrated in FIG. 6, the plug 100 has a bullet shape. As illustrated in FIG. 6, outer diameter of the plug 100 gradually increases toward a rear end from a front end.

The plug 100 includes a plug main body 101, a build-up layer 102 and a sprayed coating 103.

[Plug Main Body 101]

The build-up layer 102 is formed in a front portion of the plug main body 101. In the present specification, the "front portion" of the plug main body 101 refers to a portion between the center of the total length of the plug 100 and the front end of the plug 100. The front portion of the plug 100 has a tapered shape.

A material for the plug main body 101 is not particularly limited. The material for the plug main body 101 may be the same as the material for well-known plugs.

[Build-Up Layer 102]

The build-up layer 102 is formed around an axis (around the central axis CL) (if the plug main body 101 on surface of the plug main body 101. The build-up layer 102 is thrilled in the front portion of the plug stain body 101, and has a surface with a tapered shape that inclines with respect to the central axis CL. Hereinafter, the surface of the build-up layer 102 having a tapered shape will be referred to as tapered surface. The build-up layer 102 may be formed throughout the entire front portion of the plug main body 101, or may be formed only in a part of the front portion.

The build-up layer 102 is formed using a well-known build-up welding method such as a plasma transferred arc (PTA) method, a metal inert gas (MIG) welding method or a tungsten insert gas (TIG) welding method.

The build-up layer 102 contains an alloy including a transition metal as a principal component (for example, 50% or more). Specifically, the build-up layer 102 in the embodiment contains hard particles in addition to a matrix metal which is an alloy including a transition metal as a principal component. The matrix metal is, for example, a Co-based alloy, a Ni-based alloy, Fe-based alloy or the like. An example of the Co-based alloy is STELLITE (registered trademark). STELLITE has excellent heat resisting properties and excellent ductility. Examples of the Ni-based alloy include IN625, C276, 50Cr-50Ni, COLMONOY (registered trademark), and the like. Examples of the Fe-based alloy include stainless steel, tool steel, carbon steel and Cr steel.

The hard particles are, for example, a carbide, an oxide, a nitride, a boride, a mixture thereof or a complex compound thereof. In a case in which the hard particles are a carbide, examples of the hard particles include niobium carbide (NbC), tungsten carbide (WC), titanium carbide (TiC) vanadium carbide (VC), chromium carbide ($Cr_3C_2$) and the like. In a case in which the hard particles are an oxide, examples of the hard particles include alumina ($Al_2O_3$), zirconia ($ZrO_2$) and the like. In a case in which the hard particles are a nitride, examples of the hard particles include silicon nitride ($Si_3N_4$). Meanwhile, the hard particles are not an essential element, and a build-up layer containing no hard particles may be formed in the plug main body 101.

The thickness of the build-up layer 102 is not particularly limited. The thickness of the build-up layer 102 is preferably in a range of 1 mm to 20 mm, and more preferably in a range of 2 mm to 10 mm.

[Sprayed Coating 103]

The sprayed coating 103 is formed on the surface of the build-up layer 102. As illustrated in FIG. 6, the sprayed coating 103 is also formed on a second surface region 1012 behind a first surface region 1011 in which the build-up layer 102 is formed on the surface of the plug main body 101. In the following description, the sprayed coating 103 formed on the build-up layer 102 will be referred, to as a first sprayed region 1031, and the sprayed coating 103 formed on the second surface region 1012 will be referred to as a second sprayed region 1032.

As illustrated in FIG. 6, the surface of the build-up layer 102 is smoothly connected to the second surface, region 1012 with no level difference. Therefore, the first sprayed region 1031 is smoothly connected to the second sprayed region 1032 with no level difference.

The sprayed coating 103 is formed using a well-known spraying method, for example, arc spraying, plasma spraying, flame spraying, high-speed flame spraying or the like.

A material for the sprayed coating 103 is not particularly limited. Examples of the material for the sprayed coating 103 include metals, ceramics, cermet and the like.

The sprayed coating 103 preferably contains a metallic matrix made of a metal and a metallic oxide. Examples of the metallic oxide include W oxides, Ti oxides, Fe oxides and the like. The sprayed coating 103 more preferably contains a metallic matrix made of iron (Fe) and an iron oxide. Examples of the iron oxide include $Fe_3O_4$, FeO and the like. In this case, the sprayed coating 103 is formed by, for example, arc-spraying a steel wire rod.

The sprayed coating 103 has a high heat-shielding, property, and, furthermore, has high lubricity. In the plug 100, since the sprayed coating 103 is formed on the build-up layer 102, the amount of heat input to the plug main body 101 from the round billet BL through the build-up layer 102 during piercing-rolling is suppressed. Therefore, an increase in the temperature of the plug main body 101 during piercing-rolling is suppressed, and the plug main body 101 is not easily distorted. As a result, in the plug 100, as illustrated in FIG. 4 does not easily occur, and the occurrence of the melting loss and the seizure is suppressed.

In FIG. 6, the thickness T1 of the sprayed coating 103 formed at the front end of the plug is preferably in a range of 300 μm to 2000 μm. In addition, in FIG. 6, the thickness T2 of the sprayed coating 103 formed on the tapered surface of the build-up layer 102 is preferably in a range of 300 μm to 600 μm. In a case in which the thickness T1 and the thickness T2 are equal to or less than the upper limit, it becomes difficult to exfoliate the sprayed coating 103.

As described above, in the plug 100 according to the embodiment, it is difficult to exfoliate the sprayed coating 103 formed on the tapered surface of the build-up layer 102. Therefore, the input of heat from the build-up layer 102 to the plug main body 101 an be suppressed.

The longitudinal section shape of the tapered surface of the build-up layer 102 may have a straight-line shape as illustrated in FIG. 6, or may have other shapes. For example, the longitudinal section shape of the tapered surface of the build-up layer 102 may have a bow shape with a curvature or a plurality of curvatures, or may have other shapes.

As illustrated in FIG. 6, in the plug 100, the sprayed coating 103 includes not only the first sprayed region 1031 but also the second sprayed region 1032 disposed behind the first sprayed region 1031. Therefore, the sprayed coating 103 effectively shields the plug 100 from heat. The front end of the second sprayed region 1032 is preferably adjacent to the rear end of the first sprayed region 1031. In other words, the second sprayed region 1032 extends from the rear end of the first sprayed region 1031 toward the rear side of the plug 100. In this case, the heat-shielding property of the plug 100 due to the sprayed coating 103 further improves.

Figure 7:
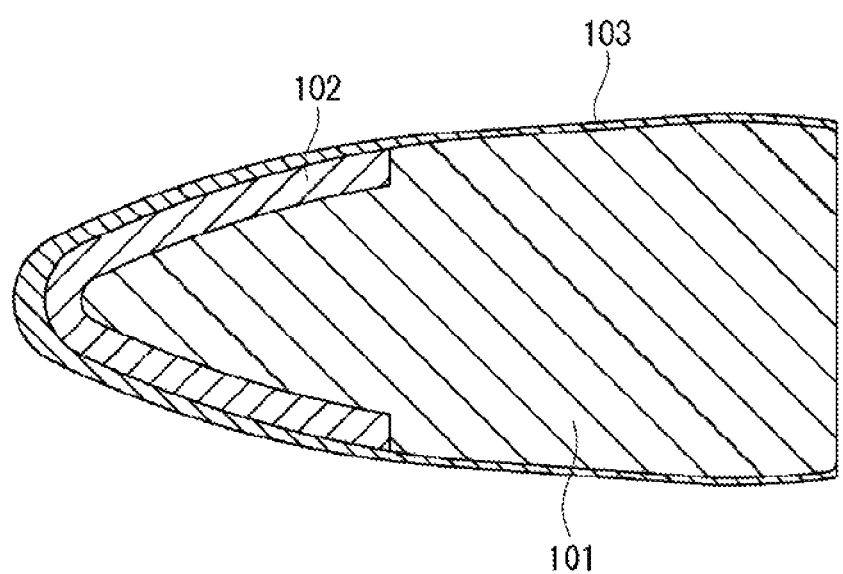
FIG. 7 is a longitudinal section view of another plug of the embodiment which has a different configuration from FIG. 6.
Figure 8:
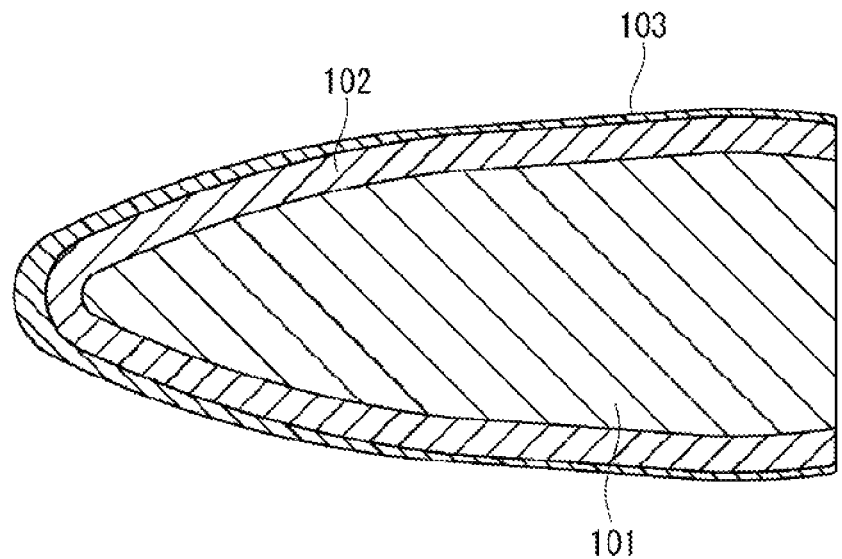
FIG. 8 is a longitudinal section view of another plug of the embodiment which has a different configuration from FIGS. 6 and 7.

In FIG. 6, the build-up layer 102 is formed only in the front end portion in the front portion of the plug main body 101. However, as illustrated in FIG. 7, the build-up layer 102 may further extend toward the rear side of the plug 100 than in the case of FIG. 6. Furthermore, as illustrated in FIG. 8, the build-up layer 102 may be formed throughout the entire surface of the plug main body 101 except for the rear and surface.

Figure 9:
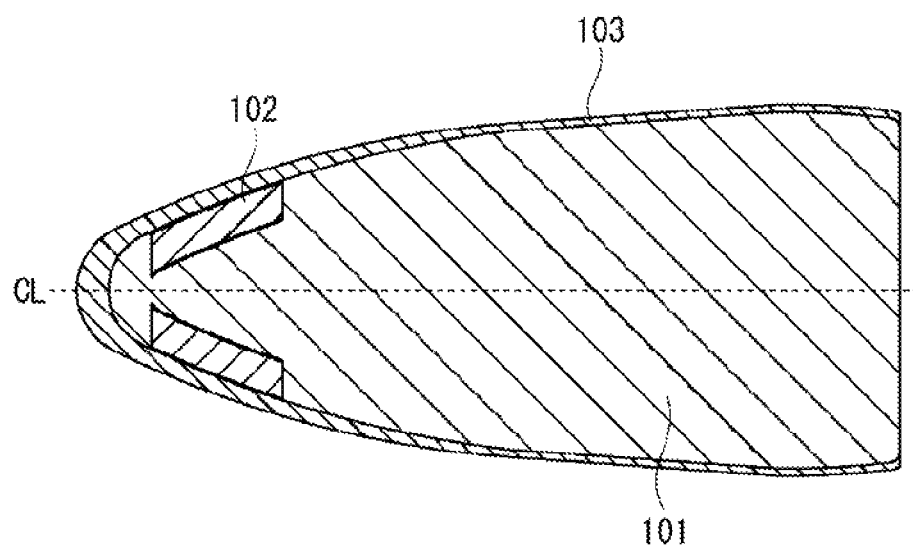
FIG. 9 is a longitudinal section view of another plug of the embodiment which has a different configuration from FIGS. 6, 7 and 8.

In the above-described embodiment, the build-up layer 102 coats the front end of the plug 100. However, in a case in which the plug 100 is used in an elongator, the build-up layer 102 may not coat the front end of the plug 100. This is because, in the elongator, a hollow shell is rolled as the workpiece and therefore the workpiece does not come into contact with the front end of the plug 100. Therefore, for example, as illustrated in FIG. 9, the build-up layer 102 may not coat the front end of the plug 100 and may be annularly formed around the central axis CL in the front portion of the plug 100.

In the above-described embodiment, the sprayed coating 103 coats the entire surface of the plug 100 except for the rear end surface. However, when the sprayed coating 103 is formed at least in a part of the build-up layer 102, the above-described effects can be obtained to some extent. However, the sprayed coating 103 preferably coats the entire build-up layer 102. In this case, it is possible to effectively suppress the input of heat to the build-up layer 102. In addition, the sprayed coating 103 may not include the second sprayed region 1032. Even in this case, the input of heat to the build-up layer 102 can be suppressed, and an increase in the temperature of the plug main body 101 can be suppressed.

In the above-described embodiment, the build-up layer 102 is formed in the front portion of the plug main body 101. The build-up layer 102 may not be formed throughout the entire front portion of the plug main body 101, and may be formed in a part of the front portion.

[Manufacturing Method]

An example of a method for manufacturing the plug 100 is as described below.

The plug main body 101 is prepared. Subsequently, the build-up layer 102 is formed on the plug main body 101 using the above-described build-up method. It is preferable to roughen the surface of the formed build-up layer 102. For example, in order to roughen the surface of the build-up layer 102 so as to improve the adhesion of the sprayed coating 103, shot blasting is carried out on the surface of the build-up layer 102.

Next, the sprayed coating 103 (1031 and 1032) is formed on the surface of the build-up layer 102 and the second surface region 1012, as needed. For example, the sprayed coating 103 is formed by arc-spraying a steel wire rod. The plug 100 is manufactured using the above-described steps.

[Examples]

Plugs with Test Numbers 1 to 11 described in Table 1 were prepared.

[Plug]

In Table 1, all of the plug lain bodies of the plugs of Test Numbers 1 to 11 had a bullet shape with a maximum outer diameter of 77 mm and a total length of 230 mm. The plug main bodies had a chemical composition equivalent to the alloy tool steel regulated in JIS G4404 (2006).

The plug of Test Number 1 included the oxidized scale coating 302 on the surface of the plug main body 301 as illustrated in FIG. 3. The thickness T1 (the thickness at the front end location of the plug, refer to FIG. 6) and the thickness T2 (the thickness at the tapered surface location, refer to FIG. 6) of the oxidized scale coating 302 were all 500 μm. In the present example, the thickness T2 at the tapered surface location was defined as the thickness at a location 80 mm away the front end of the plug.

Figure 10:
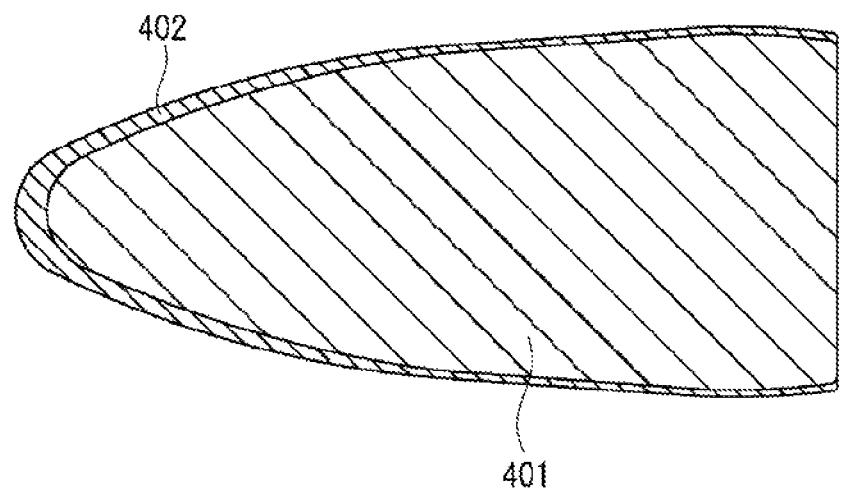
FIG. 10 is a longitudinal section a plug used in an example.

The plug of Test Number 2 included a sprayed coating 402 of iron and an iron oxide throughout the entire surface of a plug main body 401 except for a rear end surface as illustrated in FIG. 10. The sprayed coating 402 had a thickness T1 of 1500 μm, and a thickness T2 of 500 μm.

Figure 11:
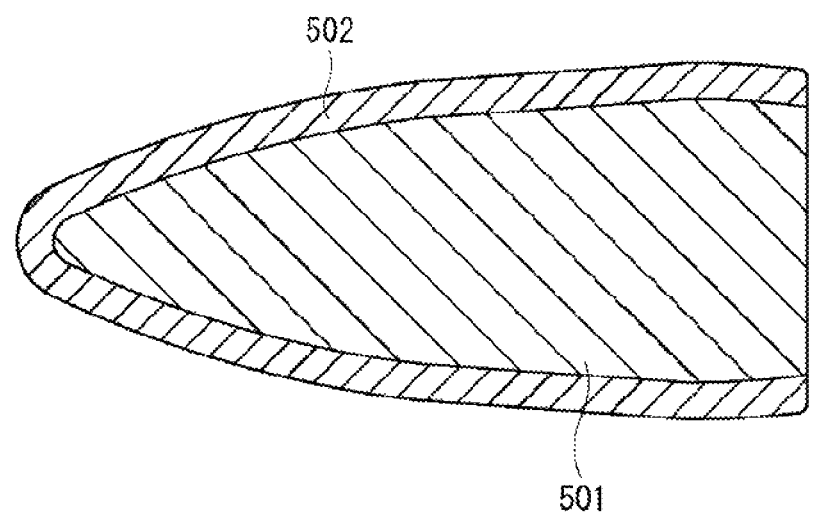
FIG. 11 is a longitudinal section view of another plug used in the example which is different from FIG. 10.

The plugs of Test Numbers 3 and 4 included a build-up layer 502 throughout the entire surface of the plug main body 501 except for the rear end surface as illustrated in FIG. 11. The thickness of the build-up layer was 2 mm. No other coating was formed on the surface of the build-up layer.

A build-up layer of Test Number 3 had a chemical composition equivalent to STELLITE No. 6. A build-up layer of Test Number 4 contained a metallic matrix having a chemical composition equivalent to STELLITE No. 6 and 50% by mass % of NbC.

The plug of Test Number 5 included the build-up layer 202 which was formed as large as 50 mm from a front end toward a rear end on a surface of the plug main body 201 and had a thickness of 5 mm, and the sprayed coating 203 which was formed on the surface of the plug main body 201 from the rear end of the build-up layer 202 to the rear end of the plug and had a thickness T2 of 500 μm as illustrated in FIG. 2. The material for the build-up layer 202 was the same as in Test Number 4.

TABLE 1

| Test Number | Build-up layer | | Oxidized scale or sprayed coating | | Thickness T1 (μm) | Thickness T2 (μm) | Result | |
|---|---|---|---|---|---|---|---|---|
| | Coated region | Material | Coated region | Material | | | Pass number | State |
| 1 | | N/A | All | Oxidized scale | 500 | 500 | 1 | Melting loss of front end |
| 2 | | N/A | All | Iron oxide | 1500 | 500 | 2 | Melting loss of front end |
| 3 | All | STELLITE 6 | | N/A | | | 0 | Seizure |
| 4 | All | STELLITE 6 + NbC 50 mass % | | N/A | | | 1 | Melting loss of front end, Seizure |
| 5 | 50 mm from front end | STELLITE 6 + NbC 50 mass % | From rear end of build-up layer | Iron oxide | N/A | 500 | 1 | Melting loss of front end |
| 6 | All | STELLITE 6 | All | Iron oxide | 1500 | 500 | 3 | Melting loss of front end |
| 7 | All | STELLITE 6 + NbC 50 mass % | All | Iron oxide | 1500 | 500 | 4 | No damage |
| 8 | 50 mm from front end | STELLITE 6 | All | Iron oxide | 1500 | 500 | 3 | Melting loss of front end |
| 9 | 50 mm from front end | STELLITE 6 | All | Iron oxide | 1500 | 300 | 3 | Melting loss of front end |
| 10 | 50 mm from front end | STELLITE 6 + NbC 50 mass % | All | Iron oxide | 1500 | 500 | 4 | No damage |
| 11 | 100 mm from front end | STELLITE 6 + NbC 50 mass % | All | Iron oxide | 1500 | 500 | 4 | No damage |

Test Numbers 6 and 7 included the build-up layer 102 which was formed on the surface of the plug main body 101 except for the rear end surface and the sprayed coating 103 formed throughout the entire surface of the build-up layer 102 as illustrated in FIG. 8. The materials for the build-up layers 102 and the materials for the sprayed coating 103 in Test Numbers 6 and 7 were as described in Table 1. The thicknesses of the build-up layers 102 were 2 mm, and the thicknesses T1 and the thicknesses T2 of the sprayed coatings were as described in Table 1 in Test Numbers 6 and 7.

The plugs of Test Numbers 8 to 10 included the build-up layer 102 which was formed as large as 50 mm from the front end toward the rear end of the plug on a surface of the plug main body 101, had a thickness of 5 mm, and was made of a material described in Table 1, and the sprayed coating 103 which was formed on the build-up layer 102 and the plug main body from the rear end of the build-up layer 102 to the rear end of the plug, and was made of a material described in Table 1 as illustrated in FIG. 6. The thicknesses T1 and T2 of the sprayed coatings 103 were as described in Table 1.

The plug of Test Number 11 had a longer build-up layer 102 than in Test Numbers 8 to 10, and was formed as large as 100 mm from the front end toward the rear end of the plug on the surface of the plug main body as illustrated in FIG. 7. As described in Table 1, other configurations were the same as in Test Numbers 8 to 10.

All of the build-up layers of the above test numbers were formed using the PTA build-up method. All of the sprayed coatings of the above test numbers were formed using the arc-spraying, method.

A solid round billet was pierced and rolled using the plug with each test number. The round billet had a diameter of 65 mm and a length of 500 mm. The chemical composition of the round billet contained 25% of Cr and 50% or Ni, and was the chemical composition of a so-called high alloy.

Each time the round billet was pierced and roiled, the surface of the plug was observed, and the presence of melting loss and seizure was visually checked. A round billet or a plurality of the round billets was rolled until the melting loss and the seizure was confirmed. In a case in which any of the melting loss and the seizure occurred, the number of the round billets (N−1) obtained by subtracting the number of the roiled round billets when the melting loss or the seizure occurred by one was defined as the number of round billets that could be rolled (hereinafter, referred to as pass number).

[Test Results]

The test results are described in Table 1. The "state" column in Table 1 describes the surface state of the plug when the test ended.

In Table 1, Test Numbers 6 to 11 were equivalent to the plug of the present embodiment. In the plugs of Test Numbers 6 to 11, the pass number was as high as 3 or more, and the plugs exhibited excellent service life. Particularly, in a case in which the build-up layer contained STELLITE and NbC, even when the pass number reached 4, there was no damage observed in the plug, and the client service life of the plug was obtained.

On the other hand, in Test Number 1, since the plug had only the oxidized scale formed on the surface, the pass number was as small as 1. After piercing and rolling, the plug was distorted and the melting loss occurred on the front end.

In Test Number 2 as well, the pass number was as small as 2. After piercing and rolling, the plug was distorted and the melting loss occurred on the front end.

In Test Numbers 3 and 4, since the plugs had the build-up layer formed throughout the entire surface, the pass number was 1 or less. In Test Number 3, seizure occurred on the end portion of the surface of the plug, and the workpiece failed to pass the plug up to the rear end and stopped. In addition, in Test Number 4 melting loss occurred on the front end portion, and seizure occurred on the surface of the plug except for the front end portion. It is considered that heat was delivered from the workpiece to the build-up layer, the temperature of the front end portion of the plug became excessively increased, and, consequently, melting loss occurred. In Test Number 5, the pass number was as small as 1, the plug was distorted, and melting loss occurred on the front end. This is considered to be because heat was delivered from the workpiece to the build-up layer, and the temperature of the front end portion of the plug became excessively increased.

Thus far, the embodiment of the present invention has been described, but the above-described embodiment is simply an example for carrying out the present invention. Therefore, the present invention is not limited to the above-described embodiment, and it is possible to carry out the above-described embodiment with appropriate modifications within the purpose of the present invention.

BRIEF DESCRIPTION OF THE REFERENCE SYMBOLS

1: PIERCER
100, 200, 300: PLUG
101, 201, 301, 401, 501: PLUG MAIN BODY
102, 202, 502: BUILD-UP LAYER
103, 203, 402: SPRAYED COMING
302: OXIDIZED SCALE COATING

The invention claimed is:

1. A plug for hot tube-making, comprising:
a plug main body;
a build-up layer formed on a surface of the plug main body around an axis of the plug main body; and
a sprayed coating formed on a surface of the build-up layer;
wherein the surface of the plug main body includes:
a first surface region in which the build-up layer is to be formed; and
a second surface region provided behind the first surface region in the plug main body, and
wherein the sprayed coating includes:
a first sprayed region formed on the surface of the build-up layer; and
a second sprayed region formed on the second surface region.

2. The plug for hot tube-making according to claim 1, wherein the second sprayed region is adjacent to the first sprayed region.

3. The plug for hot tube-making according to claim 1, wherein the build-up layer coats a front end of the plug main body.

4. The plug for hot tube-making according to claim 1, wherein the sprayed coating is formed by arc-spraying a steel wire rod.

5. The plug for hot tube-making according to claim 1, wherein a thickness of the sprayed coating at a front end location of the plug main body is thicker than a thickness of the sprayed coating at a tapered surface location of the plug main body.

* * * * *